Oct. 18, 1949.  R. A. BECKWITH  2,484,812
POWER ENERGIZING CLUTCH MECHANISM
Filed Nov. 15, 1944  6 Sheets-Sheet 1

R. A. Beckwith Inventor
By Robert Robb
Attorneys

Oct. 18, 1949. R. A. BECKWITH 2,484,812
POWER ENERGIZING CLUTCH MECHANISM
Filed Nov. 15, 1944 6 Sheets-Sheet 3

Inventor
R. A. Beckwith
By Robb and Robb
Attorneys

Oct. 18, 1949.  R. A. BECKWITH  2,484,812
POWER ENERGIZING CLUTCH MECHANISM
Filed Nov. 15, 1944  6 Sheets-Sheet 4

Inventor
R. A. Beckwith
By Robert Robb
Attorney.

Oct. 18, 1949.  R. A. BECKWITH  2,484,812
POWER ENERGIZING CLUTCH MECHANISM
Filed Nov. 15, 1944  6 Sheets-Sheet 5
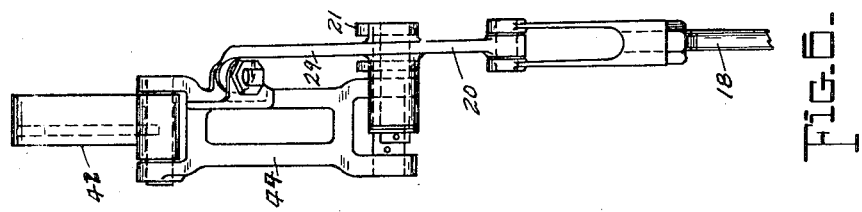
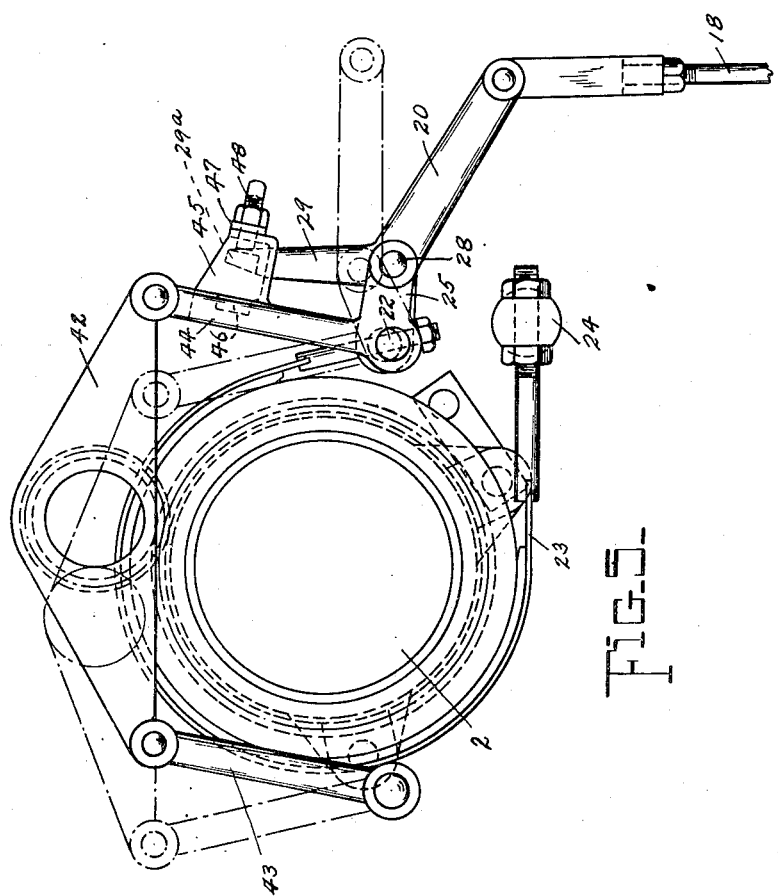

Oct. 18, 1949.  R. A. BECKWITH  2,484,812
POWER ENERGIZING CLUTCH MECHANISM
Filed Nov. 15, 1944  6 Sheets-Sheet 6

Inventor
R. A. Beckwith
By Robert Robb
Attorneys

Patented Oct. 18, 1949

2,484,812

UNITED STATES PATENT OFFICE 2,484,812

POWER ENERGIZING CLUTCH MECHANISM

Raymond A. Beckwith, Milwaukee, Wis., assignor to Koehring Company, Milwaukee, Wis., a corporation of Wisconsin Application November 15, 1944, Serial No. 563,547

3 Claims. (Cl. 192—32)

This invention relates to improvements in clutch mechanisms, especially those of the heavy duty type designed to handle heavy loads, and particularly to clutches such as are employed in power cranes, shovels, or the like, for hoisting purposes as used in hoisting cranes, and for operation of shovel units such as employed in power shovels.

The present improvements pertain to the general type of clutch means, certain construction of which, and the principles of which, are presented in my copending application for patent filed November 7, 1944, Serial No. 562,313.

The primary objective achieved in the use of the clutch mechanism hereof and of my application above identified, is to provide a clutch which is operable by suitable manual means, and in which the action of the manual means is supplemented by power effort of a constantly driven power member or unit through connection of the latter with said manual means.

An essential phase of the construction and operation of my present improved clutch lies in provisions such that the supplemental power means connected to the manual means is peculiarly linked up with the latter so that under all conditions of operation of the manual device employed for controlling the clutch, the "feel" of the loading on the clutch will be maintained incident to the operation of the manual device.

Additionally, the design of my present clutch avoids shock loading because of the "feel" control above mentioned, and because of the manner in which the power delivered to the manual device to supplement the manual effort thereon is transmitted from a constantly driven member to said manual device.

My invention hereof comprises certain alternative constructional features, by way of improvement of the mechanism of my previously identified application for patent, affording in certain ways a simplification of the design of my previous clutch mechanism, and also advantageous simplifying of operating actions of the various parts.

For a full understanding of my improvements hereof, reference is made to the following description and accompanying drawings, in which:

Figure 5 is a side view of the energizing brake drum and brake band and parts connecting the manual operating lever or member to the energizing pinion unit associated with said manual device.

Figure 6 is an end view of certain of the parts shown in Figure 5.

Figure 12 is a sectional view bringing out more clearly the mounting of the energizing control lever.

Figure 1:
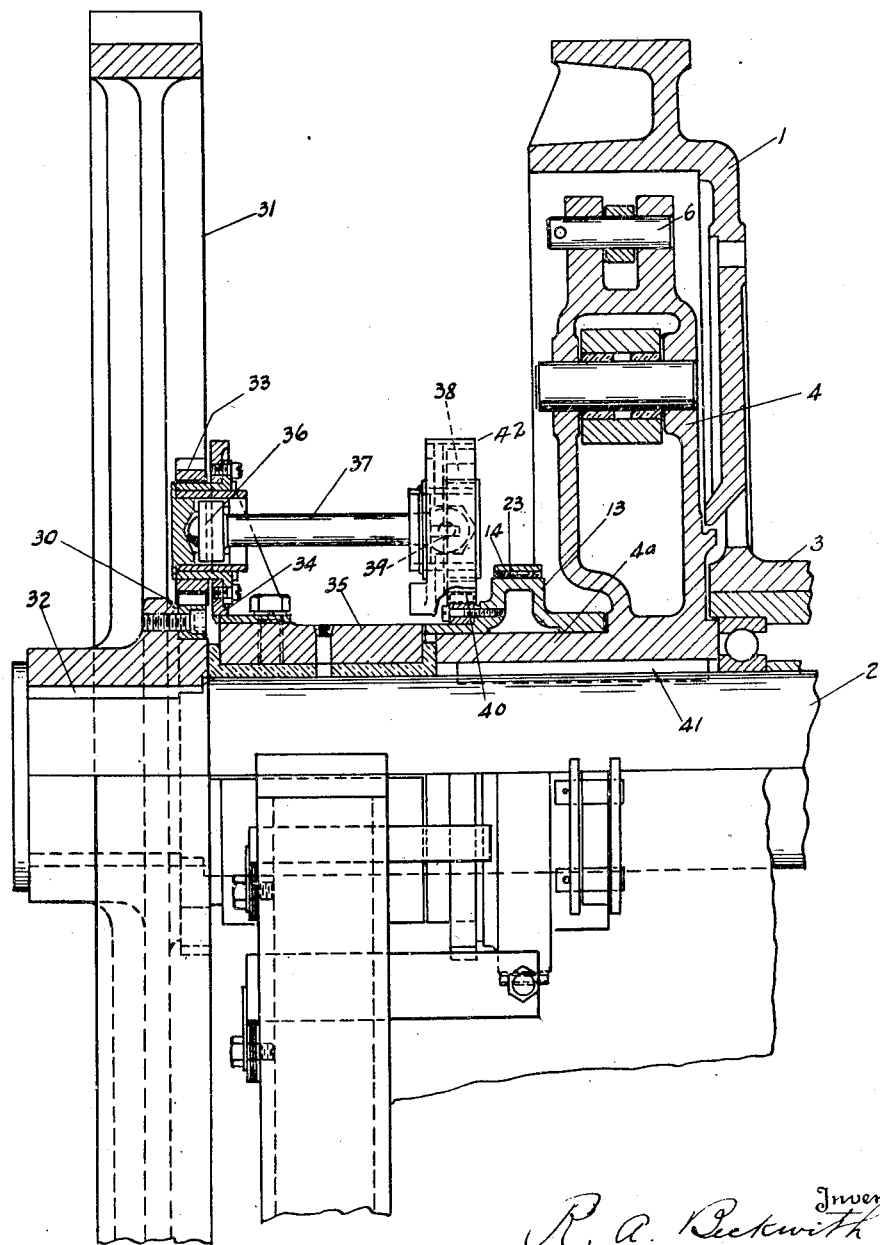
Figure 1 is a sectional view of my clutch mechanism, illustrating certain features of the supplemental power energizing means for the manual lever or operating device of the clutch mechanism.
Figure 2:
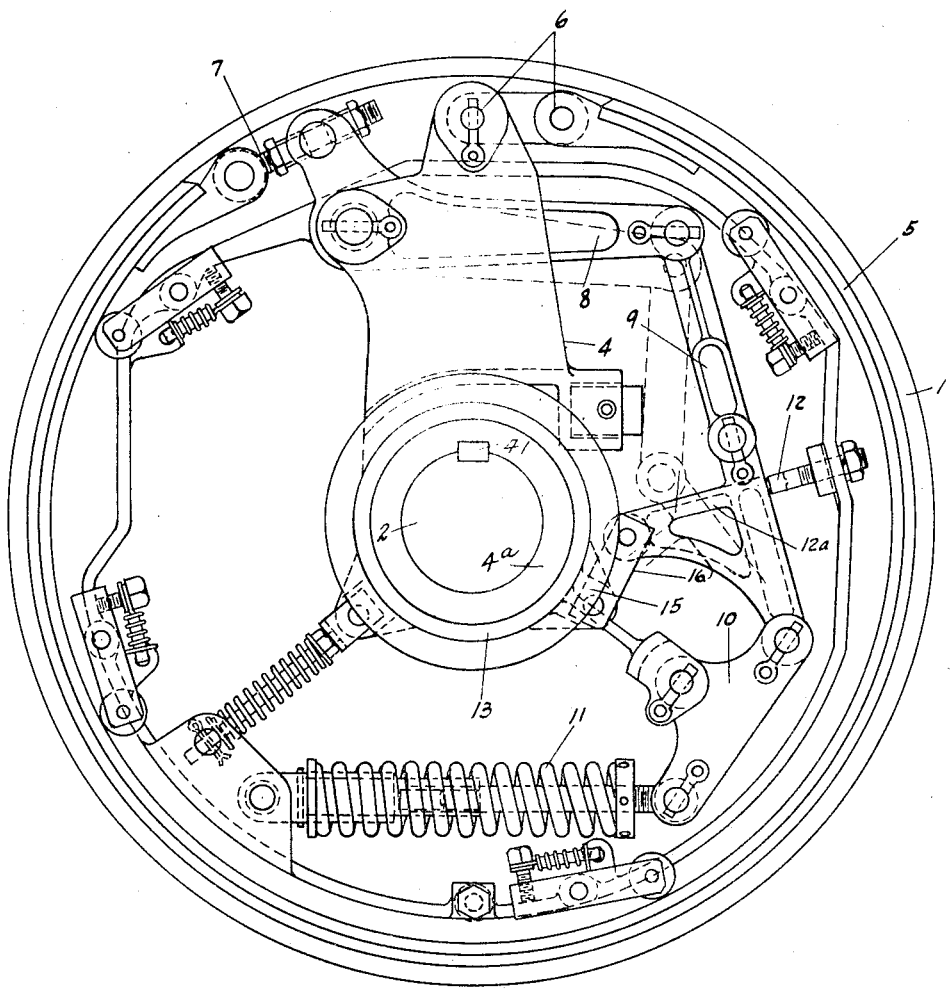
Figure 2 is a side view of the driving clutch member or spider of the clutch unit.
Figure 3:
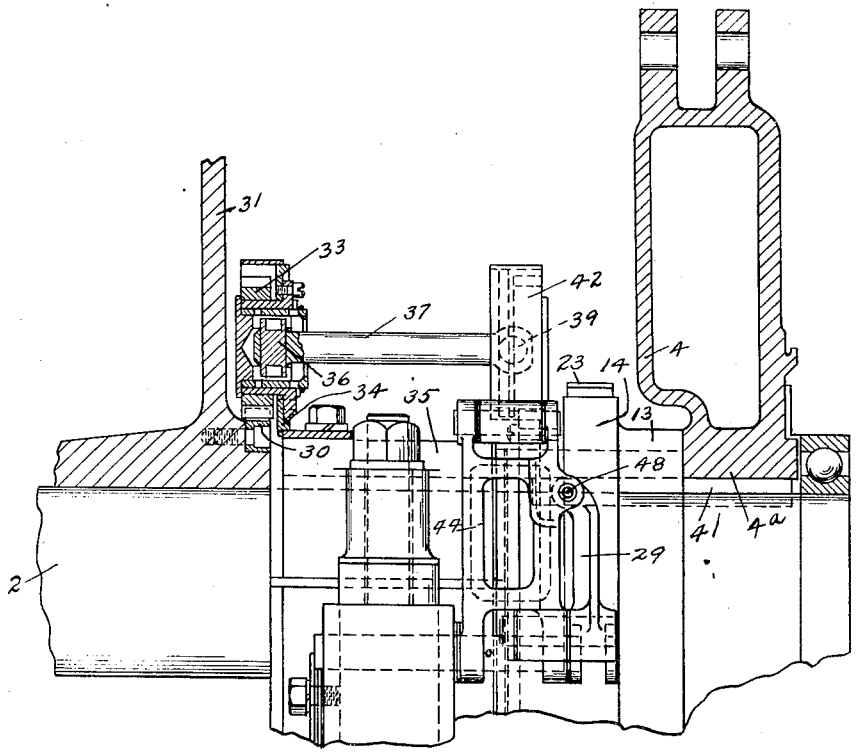
Figure 3 is a fragmentary view in elevation showing more clearly the supporting frame and bearing means for the driving shaft connected to the driving spider or member of the clutch and the supplemental energizing or power mechanism, the stationary pinion unit being illustrated in section.
Figure 4:
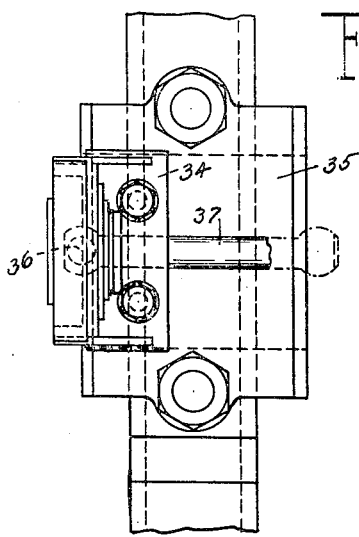
Figure 4 is a plan view of the parts which are shown largely at the left of Figure 3.

The general construction of my clutch proper will be understood upon reference primarily to Figures 1 and 2 of the drawings. The clutch includes primarily the clutch drum 1 loosely supported in relation to the constantly operated driving shaft 2 and with which drum 1 is integrally formed or otherwise attached the cable drum 3 about which a hoisting cable, such as used for certain types of cranes, may operate. Said cable drum may, however, be connected to a power shovel for controlling the crowding out and racking in movements of the latter, dependent upon the particular purpose for which the clutch is intended to be used. The drum 1 is adapted to be operated by the clutch spider 4 situated within the hollow portion of the said drum and equipped on its arm, as seen in Figure 2, with a clutch band 5 dead ended on the spider 4 at 6. The live end of the band 5 is connected by suitable adjusting means 7 with the live end of the operating lever 8 mounted on the spider 4. The opposite end of said lever 8 is connected by a toggle unit or lever 9 with an equalizing lever 10 in turn connected with a heat compensator spring 11. The toggle lever 9 when shifted to the dotted line position of Figure 2 disengages the clutch band 5 from the clutch drum 1, whilst shifting movement of said lever in the opposite direction effects partial engaging action of the band 5 on the drum 1, or full engaging action when the arm 12a of lever 9 abuts with the toggle back-lock screw 12.

The above features of my clutch may be generally characterized as known in the art, but it is to be understood that the improvements of my invention hereinafter employed may be used in connection with other detail constructions of clutches of the same general type.

On the hub 4a of the spider or driving clutch member 4 is carried a brake drum 13, the brake band engaging surface of which is designated 14, and this brake drum 13 is provided with an operating lug 15 extending radially therefrom and connected by a link 16 with the arm 12a offstanding from the lower member of the toggle lever 9, see Figure 2. It is obvious that movement of the lug 15 in one direction will effect partial or full clutch band engagement movement of the toggle lever 9, and movement of the said lug in an opposite direction will provide for the disengaging action of the clutch band 5 by shifting of the toggle lever to its broken position shown in dotted lines in Figure 2.

*Manual operating and power energizing device for the clutch*

Figure 1A:
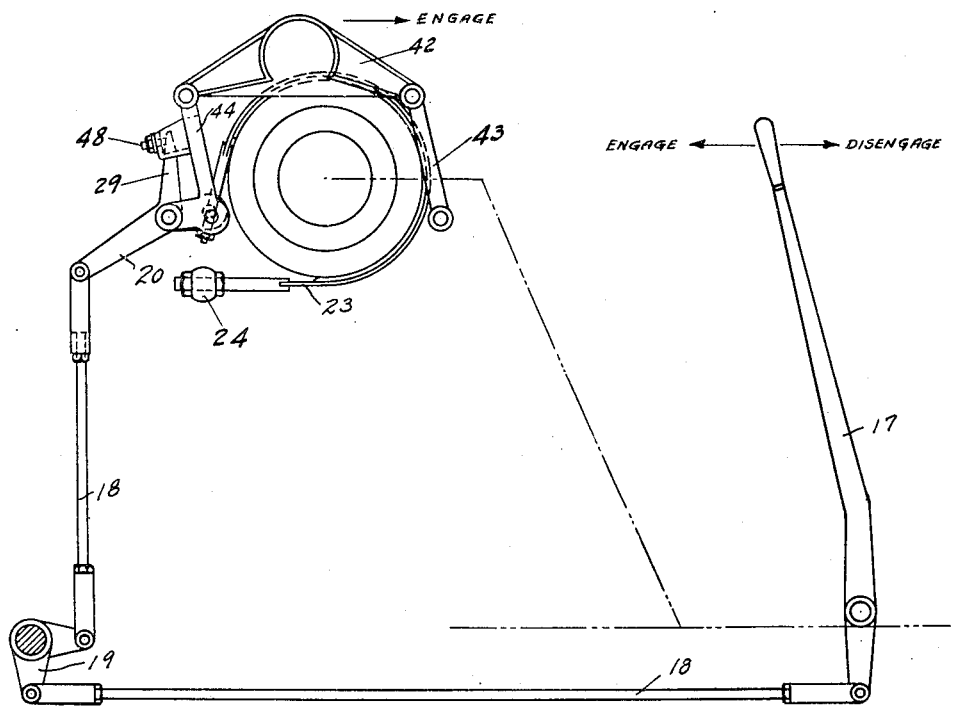
Figure 1A is a somewhat diagrammatic view showing the arrangement of the directly operated manual control lever and associated parts which are connected to the clutch.
Figure 1E:
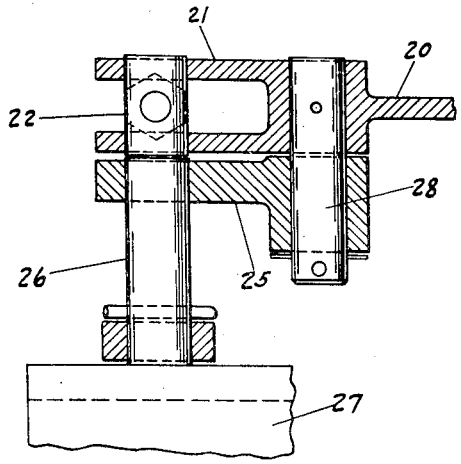
Figure 8:
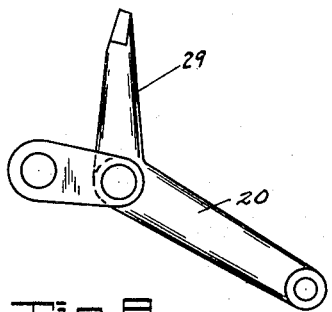
Figure 8 is a detail side view of the control lever device.
Figure 9:
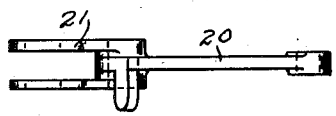
Figure 9 is a top view of the lever unit of Figure 8.
Figure 11:
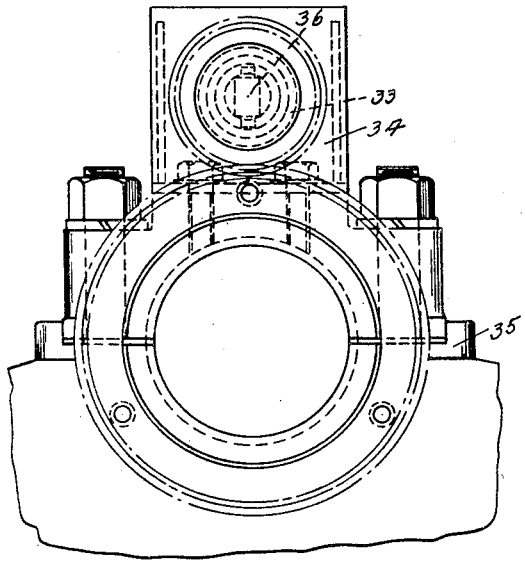
Figure 11 is an end view bringing out more clearly the mounting of the bracket that supports the stationary pinion unit on the outboard bearing for the shaft which drives the driving spider of the clutch, the pinion unit being largely shown in dotted lines.
Figure 10:
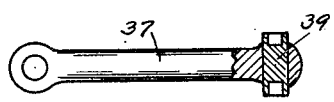
Figure 10 is a view showing the universal operating connection for attaching the stationary pinion unit to the movable pinion unit.

Figure 1A illustrates the manual operating lever 17 connected by links 18 and crank levers 19 with an actuating and energizing control lever 20, seen best in Figures 8 and 9, with its mounting illustrated as in Figure 12. The lever unit 20 comprises a brake band shifting arm 21 of forked construction attached by a swivel pin 22 to the live end of a brake band 23 surrounding the brake surface 14 of the brake drum 13, said brake band 23 being dead-ended on the frame of the machine at a suitable place as shown at 24. The lever 20 is mounted upon a supporting arm 25 extending from a shaft member 26 carried by the side stand 27 of the machine by provision of the pivot shaft 28 so that pivotal movement of the lever 20 about the axis 28 may tighten or release the brake band 23 in relation to the brake drum 13.

Extending upwardly from the lever 20 is an integral arm 29, see Figure 5, which arm, in conjunction with the lever, performs a controlling function in reference to the power energizing means of my invention as will be more fully explained.

The power energizing means is shown best in Figures 1, 3, 4, and 7. Said means includes a driving or operating gear 30 attached by bolts or suitable fastening means to the driving gear 31 which is keyed at 32 to the shaft 2. The driving shaft 2 is constantly driven by the motor of the machine in conjunction with which the clutch is employed through suitable gearing trained from such motor to the gear 31.

The operating gear 30 has its teeth in mesh with the teeth of an operating pinion 33 of a stationary pinion unit which comprises a bracket 34 on the frame 35 of the machine, adjacent to the bearing in said frame for the shaft 2, see Figure 1. The operating pinion 33 is a hollow gear and is connected by a universal joint 36 at one end of a connecting bar 37 to the movable pinion 38 of a movable pinion unit disposed in spaced relation to the stationary pinion unit.

At its opposite end the connecting bar 37 has a universal joint connection 39 with the pinion of the movable pinion unit and the said movable pinion 38 is mounted in its unit not only for rotating movement but for bodily movement around a secondary or energizing gear 40 which is secured to the brake drum 13 before mentioned.

The driving spider or member 4 of the clutch is keyed to the shaft 2 as shown at 41 and of course turns with the shaft 2 that drives said member 4.

The supporting means for the movable pinion 38 is shown clearly in Figure 5 of the drawings as comprising a beam 42, the central portion of which is provided with a housing formation to receive the pinion 38, the lower side of the beam 42 being open to permit the engagement of the pinion 38 with the energizing gear 40. The beam 42 is supported at one end by a rocker link or bar 43 at one side of the shaft 2 and frame bearing of said shaft, while the other end of the beam 42 is carried on a somewhat similar link 44 which is an integral upward extension of the arm 25 supported by the stub shaft 26.

The link 43 and link or link arm 44 are parallel and all movements imparted thereto maintain them in parallel relation.

Outstanding from the link arm 44 is a shifting arm 45 at the inner end of which is a stop or lug 46, and at the outer end of which is a transverse projection 47 provided with an adjustable set screw 48, between the inner end of which screw 48 and the lug 45 the upper end of the arm 29 of the control lever 20 is received.

Normally in the use of the energizing means of my invention there is play between said upper end 29a of arm 29 and the lug 46 and screw 48.

The foregoing describes the general mechanism of the clutch and the power energizing mechanism associated therewith and with the manual operating means set forth.

*Operation of complete mechanism*

By moving the screw 48 to tighten the same against the end 29a of the lever arm 29, with the latter crowded against the stop lug 46, my clutch mechanism may be converted into a hand controlled engaging clutch without availing of the use of the power energizing mechanism described. Under this condition the energizing brake band 23 would be removed and not used.

In the following description of the operation of the clutch mechanism we will assume that the engine driving shaft 2 and power gear 30 are rotated in a clockwise direction as the shaft 2 is seen in Figures 2 and 5, so that the gear 40 and its connected drum 13 and its associated linkage 15, 16, toggle 9, and the clutch spider 4 are all rotating in the same direction and at the same speed as said power gear 30 when the hand lever 17 is in its neutral or disengaged position.

To engage the clutch, the operator pulls the lever 17 counter-clockwise as seen in Figure 1A, the force passing through lower horizontal rod 18 connecting to and turning bell crank 19 counter-clockwise. This action raises the vertical rod 18 rotating the upper bell crank 20 clockwise. In Figure 5 this is seen counter-clockwise.

The first manual movement of the hand lever 17 causes a leftward displacement of the beam 42, Figure 5, said beam carrying with it gear 38 which is maintained in mesh with gear 40. This action is due to the pivotal action of the lever 20 moving the arm 25 around the stub shaft 26. This action of moving the beam 42 leftward as seen in Figure 5 tends to slow down the gear 40 and cause relative rotational displacement of gears 40 and 30. This causes an initial movement of the toggle 9 from the dotted line position of Figure 2 toward the full line position of said figure by the pushing or resisting effect of the lug 15 and link 16 against the arm 12a of the toggle 9 incident to the continued rotation of the spider 4 with the shaft 2; thereby applying the clutch band 5 to the drum 1. The foregoing is a wholly manual initial application of the clutch.

When the clutch band 5 engages the drum 1, resistance is met tending to prevent further leftward displacement of the beam 42 as seen in Figure 5. At this time further counter-clockwise movement of lever 17 now causes the lever 20 to pivot counter-clockwise on the shaft 28 as seen in Figure 5, causing tightening of the brake band 23 so that the same is frictionally applied to the brake drum 13, thereby tending to hold the drum 13 and gear 40 stationary while the spider 4, with the clutch toggle 9, continues to turn at the normal driving speed of the shaft 2 in a clockwise direction as seen in Figure 5. The lug 15 and drum 13 may be said in this action to be so retarded in rotation, or even momentarily stopped, that the continued turning clockwise movement of the spider 4 and the toggle 9 carried thereby results in a counter-clockwise pushing action of the lug 15, as seen in Figure 2, exerted on the arm 12a of the toggle 9, causing the clutch applying or straightening action of the toggle and corresponding clutch application of the clutch band 5 to the clutch drum 1.

In other words, the mechanical power of the shaft 2 directly driving the spider 4 effects the application of main clutch 5 coincident with and supplementing the manual power applied to the hand lever 17. The above operation continues as described as long as the clutch applying movement of the lever is continued, until the toggle 9 reaches its back-locked position shown in full lines in Figure 2, at which time the clutch parts 5 and 1 are fully engaged. At such time the hand may be removed from the lever 17 without affecting the operation of the clutch in any way. At any time, if the said pull on the lever 17 is reversed, the lever 20 is rotated clockwise, Figure 5, causing the integral arm 29 to engage the throw-out screw 48, causing rightward movement of the beam 42 as seen in Figure 5, which causes rotational displacement of gear 40 relative to gear 30 in a clockwise direction, Figure 5, thereby acting, through drum 13 and lug 15, links 16 and arm 12a, to move toggle 9 to clutch releasing position.

If, during the clutching operation by the action of the lever 17, the manual movement of the lever 17 is stopped, holding the load by the lever however, the tightening action of the brake band 23 remains proportioned to the force that holds the lever 17 at the point to which it has been moved. At such stage the pushing force of the spider 4 rotation at the link 16 maintains clutch loading constant until the latter is increased, or the clutch 5 disengaged entirely. In other words, the degree of frictional engagement of the parts of the main clutch remains constant and proportional, as fixed by the hand force on lever 17, to the friction produced between the band 23 and drum 13 tending to stop the drum and the gear 40.

In the normal operation of machines having a driving shaft 2 such as contemplated herein, the said shaft is driven always in one direction only from the engine, no reversing mechanism for the shaft being used. Furthermore, the clutch mechanism, herein described, is intended to function only during the rotation of shaft 2.

The spider 4, clutch band 5, and clutch shifting toggle unit 9, with intermediate connections thereon are constantly power driven from the driving shaft 2.

The connections including parts 18, 19, 20, 25, 44, 42, 38, 40, 13, 15, 16 and toggle unit 9 are live connections between the manual device or lever 17 and the main clutch band 5, immediately or initially responsive to the movement of said lever 17 for clutch loading by relative displacement of the rotative parts or gears 30 and 40. The brake band retarding element or unit 23 is supplementally responsive to the movement of the manual lever 17 so that the force impressed on the latter is magnified through the drum 13 for the retarding effect on the latter by which further relative displacement of rotating gears 30 and 40 is controlled, thus to augment the manual effort applied at the lever 17 for increasing mechanically, by power derived from the driving element 2, the clutch loading. The power application of the clutch devices is effected by force parallel with that constantly applied or maintained on the lever 17, and proportionate thereto, until the clutch is completely engaged. The spider 4 is a mounting, of course, for clutch shifting toggle and its connections to and including clutch band 5.

Since the pin 28 is a means for transferring the hand lever load both in travel and force to the main clutch toggle 9 and parallel to the load exerted through lug 15 from the friction of band 23 on the drum 13, it is possible for the operator to acquire a definite relationship of his lever pull to that of the pulling power of the main clutch, giving what I call the "feel" of the operator respecting the amount of pulling load the clutch is handling. In other words, in the design of clutch means shown, for example, for every pound of pull of the operator at the lever 17 the clutch toggle 9 is receiving from the lever 17, lug 15, and also lever 20, ten times such pull. In other words, every pound pull of the operator gives a clutch application force magnified ten times.

Under normal operation, for example, it takes twenty pounds at the lever to engage the clutch totally. In the linkage hookup, illustrated in Figure 1A, when the operator pulls ten pounds his hand lever movement is one half the total hand travel distance. Therefore, since the travel and the load are always relative the operator has a complete "feel" of the clutch loading present, enabling him to govern his clutch position and hand pull to the working loading requirements at that immediate time.

Figure 7:
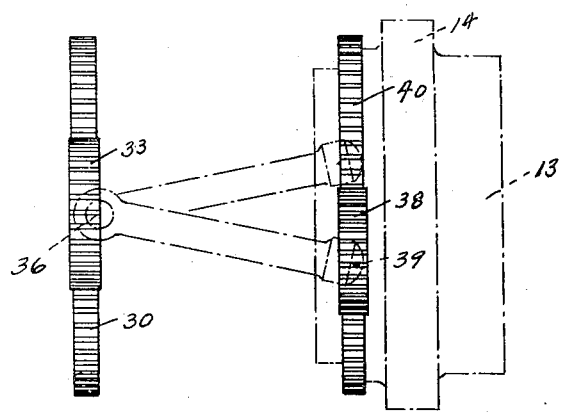
Figure 7 is a somewhat diagrammatic view looking down upon the operating gear which is constantly driven by a constantly driven gear or member of the machine, the secondary or energizing gear, and the pinion members that cooperate therewith, the view illustrating the relative movement of the energizing pinion in relation to the stationary pinion.

Referring to Figure 7, the pinion 33 meshes with gear 30; gear 38 in turn meshes with gear 40. Therefore, when the brake band 23 is applied to the drum 13, which is attached to gear 40, gear 40 is slowed up causing gear 38 to climb forward or to the left on gear 40, as seen in Figure 5. In addition, the force applied by operator on hand lever 17 also causes gear 38 to climb forward or gear 40 to turn counterclockwise. Gear mesh between 33 and 30 is retained as gear 38 crawls leftward. Gear 38 must crawl forward or left since it is being driven at a constant speed by gear 30 and therefore as gear 38 so travels, the pin 28 is also carried forward, or in Figure 5 upward and to the left as well as being forced in this direction by hand lever 17 pull. This illustrates the hookup between lever movement and the power exerted on hand operating lever 17.

Another way to describe the "feel" or load relationship between operator and the clutch application is as follows, referring to Figures 5 and 7: The gears 33 and 30 are meshed together in rotation upon their own axis; also the gear 38 and pin 28 are tied up in their lateral movements to the hand lever 17. The hand lever load is divided between brake band 23 application force and lateral movement to the left of the gear 38 and pin 28. Therefore, since the gears 33 and 30 are meshed together, any force exerted on the gear 38 is also transferred to gear 40, moving gear 38 bodily, aiding gear 40 to turn counterclockwise, see Figure 5. Thus, the turning load on the drum 14 and 13 from the brake band 23, and the turning load created or derived from the hand lever 17 create the lateral movement of the gear 38, and these loads work parallel in applying the main clutch band 5 through the movement of the lug connection 15. It is the paralleling of these two loads which gives to the operator his direct feel or contact in the movement or application action of the main clutch driving band 5, see Figure 2.

In a full manual clutch the "feel" of the operator is always present. In actual use of my clutch mechanism herein, when applying the main clutch band 5 partially by hand, since it is definitely tied and associated with the booster application actuating means herein described, the operator has the same feel operating characteristics as obtained in a full or wholly manually applied clutch.

In fact, in actual use of my clutch, it is found that the operator has better control in holding a suspended load in the power clutch application than obtained with a wholly manual clutch application. The foregoing has been ascertained by disconnecting the booster band 23 and tightening screw 48 against member 29a and lug 46, see Figure 5, whereby my clutch becomes full manual operated.

In setting steel, as one instance, it is very important that the operator of cranes has a sense of feeling relationship between the load he is handling within control limit. This cannot be obtained when there is not a close relationship between, say, the air control, hydraulic, or miniature clutch control, etc., all of which break the relationship between the hand lever pull and the load handled by the operator. For the above reasons some types of booster type arrangements that have been developed heretofore cannot be employed on cranes for setting steel, an unusually difficult job. Therefore, such cranes are often forced to apply or use fully hand operated clutches to retain the above feel control relationship, and on this account the strain of effort on the part of the operator is very great, something of course undesirable in this type of machine.

With the foregoing in view, therefore, the clutch of my invention supplies the desired requirement of affording the "feel" to the operator without the use of air pumps, hydraulic pumps, or independent miniature boosting clutches or brakes of the ordinary types heretofore proposed.

Having thus described my invention, what I claim as new and desire to secure by Letters Patent of the United States, is:

1. In a machine of the class described, in combination, a power driving element, a member to be driven thereby, clutch mechanism for drivingly connecting said member to said element including clutch shifting parts and their mounting connected to and continuously driven by said element, manual means for actuating said clutch parts, live connections between said manual means and said clutch parts for actuating the latter and through which the operator maintains the feel of the clutch loading to the driven member at all times, including a first rotating gear connected to the continuously driven clutch shifting parts, a second gear engaging and rotating with the first gear, a beam supporting the second gear to move it bodily, links connected to the ends of the beam to floatingly support same in effecting the bodily movement of the second gear, a third gear driven from the power driving element and connected to rotate with the second gear above mentioned, and instrumentalities connected to the said beam operable by the manual means to cause bodily displacement of the rotating second gear relatively to the third gear for effecting initial clutch loading of the clutch mechanism, and means also operable by the manual means to utilize the power of the driving element to act on the clutch shifting devices to supplement the manual force impressed on said manual means and move the beam to maintain the feel of the clutch loading on the manual means.

2. In a machine of the class described, in combination, a power driving shaft, a member to be driven thereby, clutch mechanism for drivingly connecting said member to said shaft including clutch shifting parts and their mounting connected to and continuously driven by said shift, a manual clutch shifting lever, live operating connections between the lever and said constantly driven clutch shifting parts for actuating the latter and through which the operator maintains the feel of the clutch loading to the driven member at all times, said connections including operating linkage and a first rotative device connected to the clutch shifting parts and movable by said linkage for controlling clutch application of the clutch shifting parts, a second rotative device connected to the driving shaft and driven thereby, connections between the said rotative devices for compelling their simultaneous rotation but permitting relative rotative displacement, and a shiftable part operable by the manual lever to effect displacement of said first rotative device relative to the second device to actuate the clutch parts for clutch loading, and a friction unit connected to the manual lever and to said shiftable part and operable by the lever to further effect clutch loading with force derived from the driving shaft and transmit the feel of the entire clutch loading to the manual lever through said rotative devices, said unit comprising means to magnify the manual force impressed on the said lever for clutch loading, said connections between the rotative devices including a floatably mounted gear connected to the first rotative device, another gear connected to the second rotative device, and a connecting bar having universal joint connections with the two last mentioned gears whereby to compel simultaneous and corresponding rotation thereof.

3. In a machine of the class described, in combination, a power driving shaft, a member to be driven thereby, clutch mechanism for drivingly connecting said member to said shaft including clutch shifting parts and their mounting connected to and continuously drive by said shaft, a manual clutch shifting lever, live operating connections between the lever and said constantly driven clutch shifting parts for actuating the latter and through which the operator maintains the feel of the clutch loading to the driven member at all times, said connections including operating linkage and a first rotative device connected to the clutch shifting parts and movable by said linkage for controlling clutch application of the clutch shifting parts, a second rotative device connected to the driving shaft and driven thereby, connections between the said rotative devices for compelling their simultaneous rotation but permitting relative rotative displacement, and a shiftable part operable by the manual lever to effect displacement of said first rotative device relative to the second device to actuate the clutch parts for clutch loading, and a friction unit connected to the manual lever and to said shiftable part and operable by the lever to further effect clutch loading with force derived from the driving shaft and transmit the feel of the entire clutch loading to the manual lever through said rotative devices, said unit comprising means to magnify the manual force impressed on the said lever for clutch loading, said connections between the rotative devices including a floatably mounted gear connected to the first rotative device, another gear support in a stationary bearing and connected to the second rotative device, and a connecting bar having universal joint connections with the two last mentioned gears whereby to compel simultaneous and corresponding rotation thereof, and a beam in which the floatably mounted gear in supported and forming the shiftable part previously mentioned, and links each pivotally supporting at one end an end of the said beam to provide the floating mounting of the aforesaid floating gear.

RAYMOND A. BECKWITH.

REFERENCES CITED

The following references are of record in the file of this patent:

UNITED STATES PATENTS

| Number | Name | Date |
|---|---|---|
| 1,054,666 | Barker | Mar. 4, 1913 |
| 1,751,647 | Nieman | Mar. 25, 1930 |
| 1,813,068 | Mitchell et al. | July 7, 1931 |
| 1,866,093 | Eilersgaard | July 5, 1932 |
| 2,348,891 | Eason | May 16, 1944 |

FOREIGN PATENTS

| Number | Country | Date |
|---|---|---|
| 195,307 | Great Britain | Mar. 29, 1923 |